United States Patent [19]

Ikawa et al.

[11] Patent Number: 4,631,232

[45] Date of Patent: Dec. 23, 1986

[54] HEAT-SENSITIVE TRANSFERRING RECORDING MEDIUM

[75] Inventors: Osamu Ikawa, Yahata; Takashi Yamahata, Yamato Koriyama, both of Japan

[73] Assignee: General Company Limited, Osaka, Japan

[21] Appl. No.: 755,451

[22] Filed: Jul. 16, 1985

[30] Foreign Application Priority Data

Jul. 18, 1984 [JP] Japan ............................ 59-147580

Aug. 21, 1984 [JP] Japan ............................ 59-172382

[51] Int. Cl.[4] .............................. B32B 27/38

[52] U.S. Cl. .............................. 428/413; 428/195; 428/422; 428/423.7; 428/48; 428/483; 428/913; 428/914

[58] Field of Search .............. 428/488.1, 484, 488.4, 428/913, 914, 195, 413, 422, 423.7, 480, 483; 106/31

[56] References Cited

U.S. PATENT DOCUMENTS 4,559,273 12/1985 Kutsukake et al. .............. 428/488.4

4,567,113 1/1986 Ohtse et al. .............. 428/488.4

*Primary Examiner*—George F. Lesmes

*Assistant Examiner*—P. R. Schwartz

*Attorney, Agent, or Firm*—Wegner & Bretschneider

[57] ABSTRACT

A heat-sensitive transferring recording medium comprises a base film, a heat melting ink layer provided on the under surface of the base film, and a conveyance improving layer provided on the upper surface of the base film, said conveyance improving layer comprising a material selected from the group consisting of compounds having a perfluoroalkyl group and ultraviolet ray-curing type resins.

5 Claims, 1 Drawing Figure

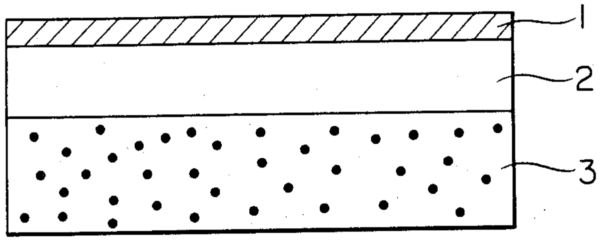
1
2
3

HEAT-SENSITIVE TRANSFERRING RECORDING MEDIUM

BACKGROUND OF THE INVENTION

1. Field of the Invention

This invention relates to a heat-sensitive transferring recording medium.

2. Description of the Prior Art

The heat-sensitive transferring recording system has many advantages as compared with prior art impact type recording systems, that is, the heat-sensitive transferring recording system can make a noiseless printing, the printed letters are clear, of high quality, and highly durable. Therefore, the heat-sensitive transferring recording system has been recently developed to a great extent and is now used for printer, typewriters and the like.

The base material of the heat-sensitive transferring recording medium was paper in the prior art, but since paper has poor humidity resistance and gives poor sharpness of printed letter, there have been recently used film bases, in particular, PET (polyethylene telephthalate) film, mainly. Among various films, PET has a relatively high melting point. However, the surface temperature of thermal head upon printing reaches instantly 300° C. or higher and therefore, so-called "stick" phenomenon is liable to occur, that is, PET film is partly melted and fused to the thermal head resulting in disturbing conveyance of the film, and at the worst, running of the film completely stops to make printing impossible.

In order to improve the film conveyance, there has been tried to apply silicone or paraffin to the surface of the film or to form a heat resistant thermosetting resin layer such as urethane resin layer, expoxy resin layer and the like on the surface of the film.

However, such countermeasures can not sufficiently prevent "stick", or require a long time heat treatment at high temperatures so as to cause the curing reaction and therefore, the working efficiency is very poor and the countermeasures can not be practically used.

In addition, even when the stick preventing effect is sufficient, if film-shapeability of the coating material and adhesivity to the PET surface are poor, the coated material falls off due to rubbing with thermal head and deposits on the thermal head portion results in formation of poor printed letters.

Other prior art method for improving the conveyance property is to use silicone resin, melamine resin or similar thermosetting resins for heat-sensitive paper and heat-sensitive transferring recording members, but this method involves chemical reactions, which are laborious, and further when coated therewith, the resulting recording medium is suffering from curling.

SUMMARY OF THE INVENTION

An object of the present invention is to provide a heat-sensitive transferring recording medium having a conveyance improving layer capable of preventing "stick", having a high film shapeability, not suffering from falling-off at thermal head portion and of high productivity.

Another object of the present invention is to provide a heat-sensitive transferring recording medium which is free from curling and is not suffering from poor conveyance, and formation of the conveyance improving layer is simple and easy.

According to the present invention, there is provided a heat-sensitive transferring recording medium comprising a base film, a heat melting ink layer provided on the under surface of the base film, and a conveyance improving layer provided on the upper surface of the base film, said conveyance improving layer comprising a material selected from the group consisting of compounds having a perfluoroalkyl group and ultraviolet ray-curing type resins.

BRIEF DESCRIPTION OF THE DRAWING

The drawing schematically show a sectional view of a heat-sensitive transferring recording medium in accordance with the present invention.

DESCRIPTION OF THE PREFERRED EMBODIMENTS

Referring to the drawing, the heat-sensitive transferring recording medium of the present invention is constituted of a heat melting ink layer 3, a base film 2 overlying the heat melting ink layer 3 and a conveyance improving layer 1 overlying the base film 2.

Various ultraviolet ray-curing type resins may be used without any particular limitation in the present invention. From the viewpoints of the coating film strength and the adhesivity to the base film, there are preferably used polyester acrylate, polyurethane acrylate, epoxy acrylate and the like. In particular, when PET is used as the base film, polyester acrylate is preferred with respect to adhesivity.

For the purpose of controlling the viscosity upon applying the resin to the surface of the base film and improving the physical properties after curing, a bifunctional and/or a trifunctional acrylate monomers may be incorporated.

As the bifunctional monomers, there are used, for example, neopentyl glycol diacrylate and diethyleneglycol diacrylate. As the trifunctional monomers, there are used, for example, pentaerythritol triacrylate, trimethylolpropane triacrylate and the like.

Incorporation of the bifunctional monomer results in lowering of the viscosity and improvement in workability while incorporation of the trifunctional monomer results in increase in cross-linking density and improvement in physical properties of the coating film after curing.

A photosensitizer may be added so as to produce efficiently radicals by ultraviolet ray.

As the photosensitizer, there may be used, for example, biacetyl, acetophenone, benzophenone, Michler's ketone, benzil, benzoin, benzoin ethyl ether, benzoyl peroxide, benzoin isobutyl ether, benzyl dimethyl ketal, tetramethyl thiuram sulfide, azobis-isobutylonitrile, di-tert-butyl peroxide, 1-hydroxycyclohexyl phenyl ketone, 2-hydroxy-2-methyl-1-phenylpropan-1-one, 1, 4-isopropylphenyl-2-hydroxy-2-methylpropan-1-one, methylbenzoyl formate and the like.

A liquid composition prepared as mentioned above is applied in a thin thickness to the film base and irradiated with ultraviolet ray, and the curing completes in several seconds to produce a hard film. The film thus cured contains three dimensional crosslinkings so that it has excellent heat resistance and good film-shapeability and can sufficiently withstand heating by thermal heads. Different from thermosetting resins, the ultraviolet ray-curing type resins can be completely cured instantly so that the production efficiency is high and a roll film can be continuously treated and wound up immediately after the treatment. Since a high temperature treatment is not necessary, the base film is not subjected to any damage.

The resulting heat-sensitive transferring recording medium provided with a heat resistive conveyance improving layer composed of an ultraviolet ray-curing type resin, on the back side, does not suffer from so-called "stick" phenomena and exhibits a very high production efficiency.

In particular, where PET is used as the base film and a polyester acrylate is used as the ultraviolet ray-curing type resin, the resulting conveyance improving layer strongly adhers to the base film and does not peel off or fall off when rubbed with guide rolls or thermal heads of printers.

As the base film, there may be used polyethylene terephthalate as mentioned above, polyethylene, polypropylene, polystyrene, polyesters, polyimides, triacetylcellulose, nylon, polycarbonates and the like.

Alternatively, the conveyance improving layer is mainly comprised of a compound having perfluoroalkyl group(s). The term "perfluoroalkyl group" means an alkyl group whose hydrogen atoms are all substituted with fluorine atoms. When the compound having perfluoroalkyl group(s) is used, the conveyance improving compound exhibits high heat resistance and good sliding property.

The compound having perfluoroalkyl group(s) used in the present invention is, for example, perfluoroalkyl carboxylic acid salts, perfluoroalkyl carboxylic acid ester, perfluoroalkyl sulfonic acis salts, perfluoroalkyl phosphoric acid esters, perfluoroalkyl betaine, perfluoroalkyl trimethyl ammonium salts and the like.

In particular, perfluoroalkyl phosphoric acid esters and perfluoroalkyl betaines are preferable.

Examples of perfluoroalkyl carboxylic acis salts or esters are compounds of the formula:

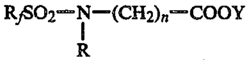

where $R_f$ is a perfluoroalkyl having 3–16 carbon atoms, R is hydrogen or alkyl having 1–8 carbon atoms, Y is alkyl having 2–10 carbon atoms or Na or K, and n is an integer of 1–8.

Examples of perfluoroalkyl sulfonic acid salts are compounds of the formula:

$$R_f-(CH_2)_n-SO_3Y$$

where $R_f$ is perfluoroalkyl having 3–16 carbon atoms, Y is Na or K, and n is an integer of 1–8.

As the perfluoroalkyl phosphoric acid esters, there are preferably used those having a perfluoroalkyl group having 3–25 carbon atoms such as, for example,

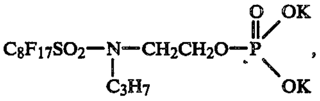

,

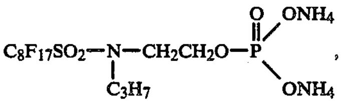

,

-continued

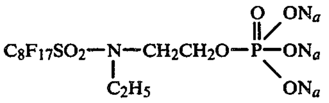

and the like.

As perfluoroalkyl betaines, there are mentioned, for example,

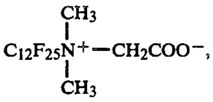

,

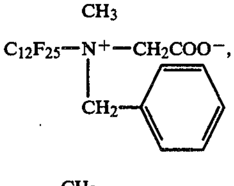

,

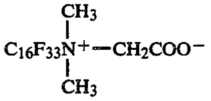

and the like.

As perfluoroalkyl trimethyl ammonium salt, there is used, for example, a compound of the formula:

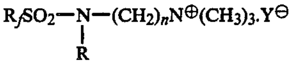

where $R_f$ is perfluoroalkyl having 2–16 carbon atoms, R is hydrogen or alkyl having 1–8 carbon atoms, Y is Cl or Br, and n is an integer of 2–8.

The compound having a perfluoroalkyl group is applied to a film, for example, a 6μ thick polyethylene terephthalate film in the thickness of 0.01μ–0.1μ. When the coating thickness is less than 0.01μ, the conveyance property is not sufficiently improved. When the coating thickness is thicker than 0.1μ, the compound is sometimes deposited on the thermal head portion resulting in disturbing the printing. When the coating thickness is in the range of 0.01μ to 0.1μ, no deposition of the compound on the head portion occurs even when the running is carried out for a long period of time and the conveyance property is good. Thus, the heat-sensitive transferring recording medium gives good printing.

According to the present invention, the medium is almost free from curling in addition to various advantages such as prevention of poor conveyance and easy and simple coating formation of the conveyance improving layer.

EXAMPLE 1

A resin liquid of the following formulation was prepared.

| | |
|---|---|
| polyester acrylate having the formula as shown below | 100 parts by weight |
| Neopentylglycol diacrylate | 30 parts by weight |
| Pentaerythritol triacrylate | 20 parts by weight |

-continued

| | |
|---|---|
| Benzophenone | 3 parts by weight |
| Xylene | 100 parts by weight |

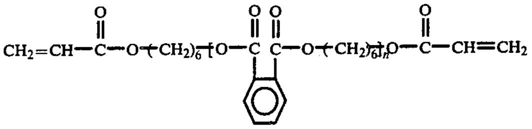

where n is 5–10. The polyester acrylate used here may be a mixture of compounds of the formulas of various "n" values. The "n" may be 2–20.

The resin liquid was applied to one surface of PET film of 6μ thick by means of a roll-coater in the thickness of 2μ (when dried) at a speed of 20 m/min., dried and exposed to ultraviolet ray from two high pressure mercury ultraviolet ray lamps each of which had a capacity of 80 W/cm, and then the PET film thus coated was wound up in a form of a roll.

To the other surface of the PET film was applied in the thickness of 4μ a hot melt ink of the following formulation by using a roll coater.

| | |
|---|---|
| Wax | 70 parts by weight |
| Carbon black | 15 parts by weight |
| Fatty acid amide | 15 parts by weight |

Printing test of the resulting heat-sensitive transferring recording medium was carried out by means of P6 printer (tradename, manufactured by Fuji Xerox Co., Japan) and 1000 sheets of B-4 paper were printed. Any stick did not occur at all, and neither was observed anything wrong such as attaching of refuse to guide rolls and the thermal head in the printer and the like. Good printing was able to be conducted up to the end.

EXAMPLE 2

To the under surface of a polyester film of μ thick was applied a heat melting ink prepared by mixing 30 parts by weight of carnauba wax, 35 parts by weight of ester wax, 25 parts by weight of pigment, and 10 parts by weight of oil. To the upper surface of the heat-sensitive transferring recording medium thus formed was applied a 3% aqueous solution of perfluoroalkyl betaine of the formula,

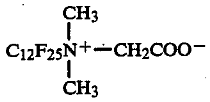

and dried to form a coating layer of about 0.05 μ.

The resulting heat-sensitive transferring recording medium was subjected to printing by means of P6 printer (tradename, manufactured by Fuji Xerox Co., Japan). The conveyance characteristic was good and no sticking to the head occurred resulting in smooth printing, and in addition, no curling of the heat-sensitive transferring medium was observed and thereby the medium was easily charged in the machine.

A heat-sensitive transferring recording medium without the conveyance improving layer exhibited poor conveyance characteristic and sticking occurred to that clear printed letters were not obtained.

EXAMPLE 3

Repeating the procedures of Example 2 except that an aqueous solution containing 2% perfluoroalkyl phosphoric acid ester of the formula,

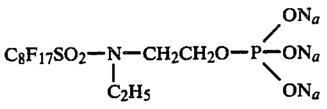

and 0.1% surfactant, Aerosol OT (tradename, produced by American Cyanamide Co.) was applied and dried in place of a 3% aqueous solution of the perfluoroalkyl betaine, there was produced a heat-sensitive transferring recording medium with a layer of about 0.1μ thick of the above-mentioned composition.

This medium was subjected to a printing test in a way similar to that in Example 2 and a good result similar to Example 2 was obtained.

What we claimed is:

1. A heat-sensitive transferring recording medium which comprises a base film, a heat melting ink layer provided on the under surface of the base film, and a conveyance improving layer provided on the upper surface of the base film, said conveyance improving layer comprising a material selected from the group consisting of compounds having a perfluoroalkyl group and ultraviolet ray-curing type resins.

2. A heat-sensitive transferring recording medium according to claim 1, in which the compound having a perfluoroalkyl group is selected from the group consisting of perfluoroalkyl carboxylic acid salts, perfluoroalkyl carboxylic acid esters, perfluoroalkyl sulfonic acid salts, perfluoroalkyl phosphoric acid esters, perfluroalkyl betain and perfluoroalkyl trimethyl ammonium salts.

3. A heat-sensitive transferring recording medium according to claim 1 in which the compound having a perfluoroalkyl group is selected from the group consisting of perfluoroalkyl phosphoric acid esters and perfluoroalkyl betaine.

4. A heat-sensitive transferring recording medium according to claim 1 in which the ultraviolet ray-curing type resin comprises:

(a) a base polymer selected from the group consisting of polyester acrylates, polyurethane acrylates and epoxy acrylates, (b) at least one reactive diluent selected from the group consisting of bifunctional acrylate monomers and trifunctional acrylate monomers, and (c) a photosensitisizer.

5. A heat-sensitive transferring recording medium according to claim 4 in which the base polymer is polyester acrylate and the base film is polyethylene terephthalate.

* * * * *